United States Patent [19]

Moseley, Jr.

[11] 4,054,157

[45] Oct. 18, 1977

[54] COUPLING DEVICE FOR PIPES HAVING A CONVEX SHAPED OR A STRAIGHT TUBULAR END

[76] Inventor: Charles D. Moseley, Jr., P.O. Box 449, Lynchburg, Va. 24503

[21] Appl. No.: 588,773

[22] Filed: June 20, 1975

[51] Int. Cl.² .............................................. F15D 1/06
[52] U.S. Cl. .................................... 138/42; 138/40; 138/103; 285/8; 285/354
[58] Field of Search .................. 138/39, 40, 42, 44, 138/103; 277/212 F; 285/354, 8; 403/342

[56] References Cited

U.S. PATENT DOCUMENTS

| 772,279 | 10/1904 | Growelle et al. | 138/44 X |
|---|---|---|---|
| 1,384,086 | 7/1921 | Poppenhusen et al. | 138/44 |
| 1,850,030 | 3/1932 | Pardoe | 138/44 X |
| 2,074,690 | 3/1937 | Gerdts | 138/44 X |
| 2,146,100 | 2/1939 | Welch | 138/44 |
| 2,507,535 | 5/1950 | Madsen | 285/8 |
| 2,868,013 | 1/1959 | Teppell | 138/44 X |
| 3,877,488 | 4/1975 | Baturay et al. | 138/44 |
| 3,894,562 | 7/1975 | Moseley et al. | 138/44 |

FOREIGN PATENT DOCUMENTS

| 293,379 | 7/1914 | Germany | 138/44 |
|---|---|---|---|
| 1,055,304 | 4/1959 | Germany | 138/44 |
| 715,496 | 12/1941 | Germany | 277/212 F |
| 244,327 | 3/1912 | Germany | 215/31 |
| 216,485 | 2/1941 | Switzerland | 277/212 F |
| 84,739 | 9/1918 | Switzerland | 277/212 F |
| 686,095 | 1/1953 | United Kingdom | 277/212 F |

Primary Examiner—Richard E. Aegerter
Assistant Examiner—James E. Bryant, III

[57] ABSTRACT

A device is disclosed which is adapted to be inserted in the threaded end of the sleeve of a pipe coupling to permit connection of piping thereto having either a convex-shaped end or a straight-tubular end by means of a correspondingly threaded nut which is capable of exerting an axially compressive force on the device. The device has a through bore, a portion of which is a socket substantially concave in shape for receiving the convex-shaped pipe end and a portion which is tubular in shape for receiving the straight tubular pipe end.

5 Claims, 5 Drawing Figures

U.S. Patent  Oct. 18, 1977  4,054,157
FIG. 1
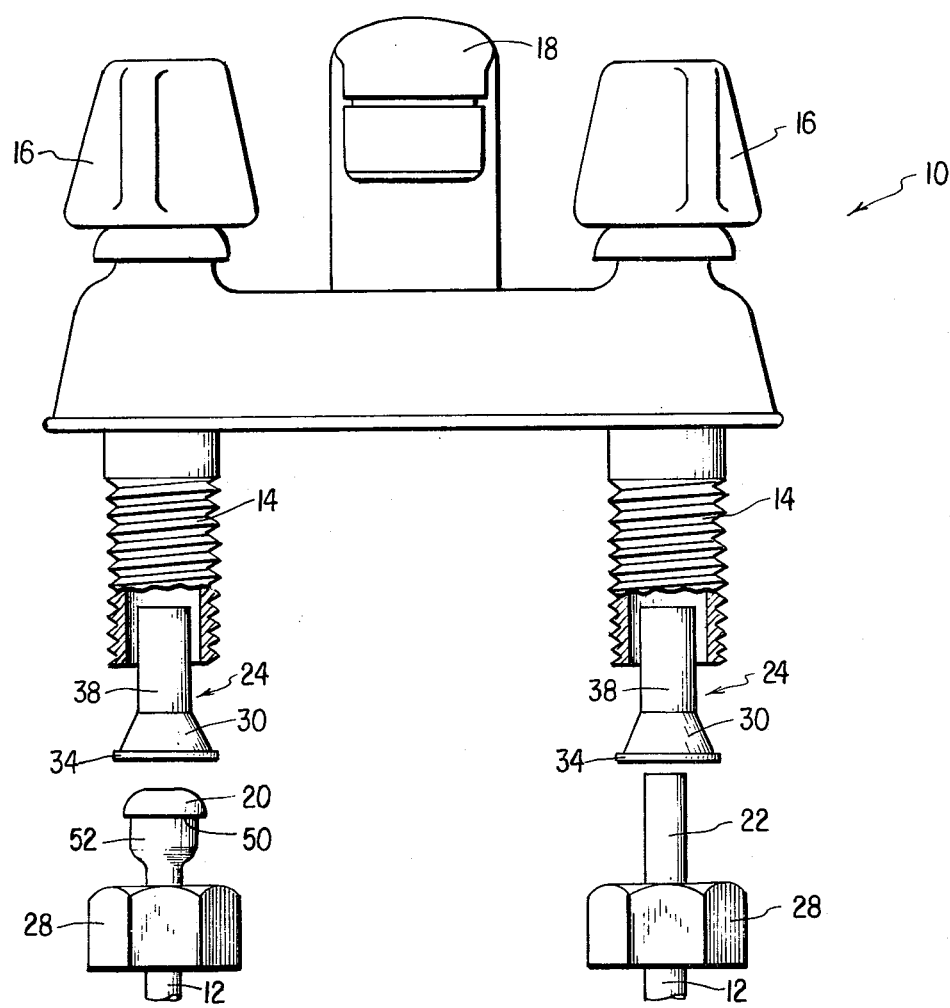
FIG. 2
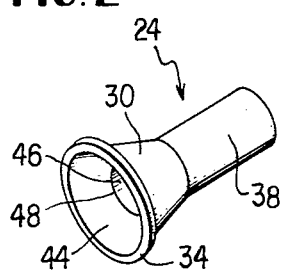
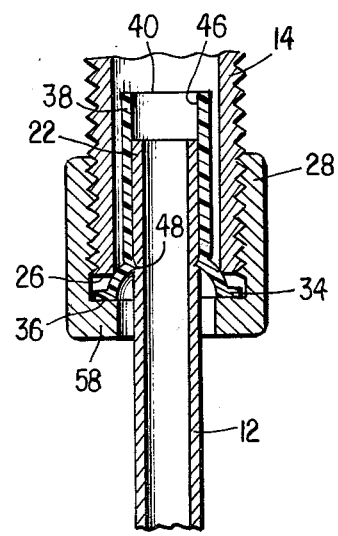
FIG. 3  FIG. 4
FIG. 5
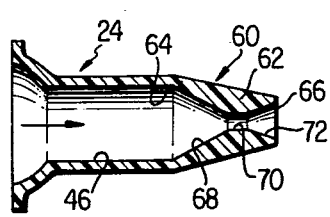

COUPLING DEVICE FOR PIPES HAVING A CONVEX SHAPED OR STRAIGHT TUBULAR END

CROSS REFERENCES TO RELATED APPLICATIONS

Applicant hereby incorporates by reference the material disclosed in my allowed copending application Ser. No. 426,570, now U.S. Pat. No. 3,894,562, filed Dec. 20, 1973 in which the issue fee has already been paid.

FIELD OF THE INVENTION

This invention relates to pipe couplings and more particularly to a device which can be inserted in the threaded sleeve of a pipe coupling to enable piping having either a convex shaped end or a straight tubular end to be joined to the sleeve in fluid tight sealing engagement.

DESCRIPTION OF THE PRIOR ART AND OBJECTS

Applicant is unaware of any device in the pipe coupling art which can be inserted in the threaded sleeve of a pipe coupling to enable piping having either a convex shaped end or a straight tubular end to be joined in fluid tight sealing engagement with the sleeve, as a portion of the device is subjected to an axially compressive force generated between a coupling nut and the threaded sleeve.

It is therefore the primary object of the present invention to provide a single device to enable piping having either a convex shaped end or a straight tubular end to be connected, by means of a nut, to the threaded sleeve of a pipe coupling.

Another object of the invention is to provide a device for joining piping which is made of a deformable plastic-like material to insure fluid tight sealing and also be chemically inert with substances passing through the device.

It is a further object of the invention to provide a device for joining piping which is of greatly simplified construction and relatively inexpensive to manufacture.

Other objects and advantages of the invention will appear from the following description taken in conjunction with the drawing.

BRIEF DESCRIPTION OF THE DRAWINGS

FIG. 1 is a view in elevation and in section of the present invention partially inserted in the threaded sleeve of a fixture and the various types of connecting piping and the end nuts in their unassembled state relative thereto.

FIG. 2 is a perspective view of the coupling element of the present invention.

FIG. 3 is a cross-sectional view in elevation of a pipe coupling employing the coupling element of the present invention with a connecting pipe having a convex-shaped end.

FIG. 4 is a cross-sectional view in elevation of a pipe coupling employing the coupling element of the present invention with a connecting pipe having a straight, tubular end.

FIG. 5 is a cross-sectional view of the coupling element of the present invention in combination with a controller for limiting the rate of fluid flow through the device to a predetermined amount.

DETAILED DESCRIPTION OF THE PREFERRED EMBODIMENT

Referring now to the drawing where like numerals indicate like elements in each of the several figures, FIG. 1 shows generally at 10 a standard fixture for sinks and the like to which is connected piping 12 normally carrying hot and cold water. The fixture 10 has tubular threaded sleeves 14 connected to valves (not shown) controlled by knobs 16 for regulating the flow of water to the outlet 18. The piping 12 is connected to a source of water (not shown) and it can have either a convex-shaped end 20 or a straight, tubular-shaped end 22 as will be more fully described with reference to FIGS. 3 and 4.

In order to connect piping having either end 20 or 22 in fluid tight sealing engagement with the threaded sleeve 14, my novel coupling element indicated generally at 24 is inserted into the threaded sleeves 14 so that a portion thereof rests between the end of the sleeve 26 and the inside of a correspondingly threaded compression nut 28.

My coupling element 24 comprises a housing having a frusto-conical shaped outer surface section 30, the largest diameter of which terminates at one side 32 of a circumferential flange 34. The diameter of the flange 32 is slightly greater than the largest diameter of the outer surface section 30 and forms, at the other side 36, one end of the element 24. The smallest diameter of the frusto-conical outer surface section 30 extends a short distance in the form of a hollow, cylindrical shaped section 38 and terminates at the other end 40 of element 24. A bore is provided through the element 24 having a first portion 42 in the shape of a substantially concave socket 44 which extends inwardly from the side 36. The concave socket 44 has the same substantial shape as the convex-shaped end 22 of piping 12. A second portion of the bore is a hollow tube 46 which opens into the concave socket 44 at one end 48 and extends to the other end 40 of element 24. The diameter of the hollow tubular shaped bore 46 is slightly larger than the outside diameter of the straight tubular-shaped end 22 of connecting piping 12. The element 24 is made of a suitable type of plastic material that is easily cast and yet has a certain degree of elasticity or resiliency so that it will not be permanently deformed when installed and can thus be easily removable and reusable. For this purpose, I have found that synthetic material such as CELCON* made by the Celanese Corp. or DELRON* made by E. I. duPont de Nemours & Co. to be very satisfactory because it can be molded easily into strong, well defined sections which retain the required flexibility. Such materials have a high chemical resistance to substances such as certain acids, oils, refrigerants, solvents and other types of fluids should the element 24 be used in a coupling carrying those types of substances.

*Registered Trademark

Referring now to FIG. 3, wherein the element 24 is shown in an assembled coupling connected to a pipe 12 having a convex-shaped end 20. The convex-shaped end 20 terminates at its largest diameter to form a radially extending ridge 50 with the flared end 52 of pipe 12. The smallest diameter of the convex-shaped end 20 terminates at a circular recess 54 having the same substantial diameter as the inside of piping 12. In order to prevent the convex-shaped end 20 from deforming under a compressive force, a non-metallic ring 56 is provided on the inside of the end 20. Piping having such a convex-shaped end is conventional and is made by, for example, the Brass Craft Corp. of Detroit, Michigan. The nut 28 has an inwardly, radially extending shoulder 58 which when slid over the flared end 52 engages the radially extending ridge 50 of end 20. With the coupling element 24 in position within the threaded sleeve 14 as shown and the nut 28 tightened onto the sleeve 14, the convex-shaped end 22 is forced into the concave socket 44. As the nut 28 is further tightened, the end 26 of threaded sleeve 14 will slightly distort the approximate midpoint of outer surface section 30 and socket wall 44 toward and against the convex-shaped end 20 to form a fluid tight seal therebetween.

Referring now to FIG. 4, wherein the element 24 is shown in an assembled coupling connected to a pipe 12 having a straight tubular-shaped end 22, with the coupling element 24 in position within the threaded sleeve 14 and the nut 28 loosely positioned thereon, the tubular-shaped end 22 is slid through socket 44 a distance into hollow tube 46. As the nut 28 is tightened onto threaded sleeve 14, the radially extending shoulder 58 engages the other side 36 of element 24 and forces outer surface section 30 into engagement with the end 26. Further tightening of nut 28 causes the end 48 of hollow tube 46 to be inwardly, radially distorted until it engages the tubular-shaped end 22 whereupon with continued tightening of nut 28, the axially applied compressive force on the side 36 of element 24 is sufficient to cause the end 48 to crimp the tubular-shaped end 22 to thereby effect a fluid tight seal therebetween.

Whenever the nut 28 is loosened in either the coupling of FIG. 3 or 4, the resiliency of the material of which element 24 is made permits it to return to its original shape and the ends 20, 22 to be removed therefrom.

Referring to FIG. 5, the coupling element 24 is shown in combination with the fluid flow controller 60 disclosed in my allowed, copending patent application previously mentioned and the complete disclosure of which is incorporated by reference herein. The fluid flow controller 60 relies on the phenomenon of cavitation for limiting the flow (see arrow) of a liquid through the device to a predetermined rate and maintains this flow rate irrespective of fluctuations in the pressure of the fluid entering the device above the amount necessary to initiate cavitation.

Briefly, the controller 60 comprises a housing 62 having a bore extending from an inlet opening 64 in communication with and of the same diameter as the cylindrical portion 46 of the coupling element 24 to an outlet opening 66. The bore is divided into three chambers, a convergent chamber 68, a cavitation chamber 70 and a diffusing chamber 72. The shape of the cavitation chamber 70 is such that cavitation of the liquid passing therethrough occurs when the pressure of the liquid entering the inlet 64 reaches a predetermined amount. Such cavitation limits the flow rate of liquid through the outlet opening 66 above the predetermined amount. The cavitation chamber 70 is cylindrical in shape and has a length approximately equal to its diameter. The diffusing chamber 72 is also shaped to dissipate the cavities formed in the fluid in an area away from the inside surface of the connecting piping to prevent destruction thereof by the dissipating cavities. The amount of taper of the diffusing chamber 72 away from the cavitation chamber 70 is at most 10° with respect to the axis of rotation of the diffusing chamber 72 to insure the aforementioned dissipation.

I have thus disclosed my single coupling element which permits piping having either a convex-shaped end or a straight tubular-shaped end to be connected to the threaded sleeves of fixtures and the like to thereby provide a fluid tight connection therebetween. I have also disclosed my single coupling element integrally formed with my fluid flow controller to provide a single device which is both a coupling element and which is capable of limiting to a predetermined rate the flow of a fluid to a fixture.

What I claim is:

1. The combination of a pipe coupling having a sleeve with a threaded end and a device insertable into said threaded end for permitting the connection of piping to said sleeve by a correspondingly threaded nut, said piping having either a convex-shaped end or a straight tubular end, said device comprising:

a. a housing having a frusto-conical outer surface section which has its largest diameter adjacent one end of said housing and its smallest diameter extending in the form of a cylindrical-shaped section to the other end of said housing, said housing further having a circumferential flange adjacent said largest diameter at said one end, and b. a through bore in said housing, a first portion of said through bore being in the shape of a substantially concave socket extending inwardly from said one end of said housing for receiving said convex shaped end of said connecting piping and a right cylindrical portion extending from said concave socket to said other end of said housing for receiving said straight tubular end of said connecting piping, the junction of said concave socket and said cylindrical portion of said bore being closer to one end of said housing than is the junction of said frusto-conical outer surface section and said cylindrical shaped section and said frusto-conical outer surface section being so tapered with respect to the longitudinal axis of rotation of said housing that said threaded end of said sleeve will engage the approximate mid-point of said tapered surface at a bearing point so that any axially applied compressive force exerted by said threaded nut between said circumferential flange and said bearing paint will cause said concave socket to be inwardly, radially distorted into fluid tight engagement with said convex-shaped end of said connecting piping or said compressive force will cause said frusto-conical section to flex at said bearing point thereby inwardly, radially distorting said junction into fluid tight engagement with said straight tubular end of said connecting piping.

2. The combination as set forth in claim 1 wherein said housing is made of a plastic-like material of sufficient rigidity to thereby crimp said straight tubular end to provide a water tight seal therebetween during application of said compressive force yet said material is sufficiently flexible so that upon removal of said compressive force said radially distorted junction will withdraw from said crimp in said straight tubular end to permit removal of same from said right cylindrical portion.

3. The combination of a pipe coupling having a sleeve with a threaded end and a device insertable into said threaded end for permitting the connection of piping to said sleeve by a correspondingly threaded nut and which is capable of limiting the flow of a liquid through said device to a predetermined rate, said piping having either a convex-shaped end or a straight tubular end, said device comprising:
- a. a housing having a frusto-conical outer surface section which has its largest diameter adjacent one end of said housing and its smallest diameter extending in the form of a cylindrical-shaped section to the end other of said housing.
- b. a through-bore in said housing, a first portion of said through-bore being in the shape of a substantially concave socket extending inwardly from said one end of said housing for receiving said convex-shaped end of said connecting piping, a cylindrical portion extending a distance from said concave socket for receiving said straight tubular end of said connecting piping, and
- c. a cavitation chamber adjacent said cylindrical portion, said cavitation chamber being shaped such that cavitation of said liquid occurs throughout said chamber when the pressure of said liquid in said cylindrical portion reaches a predetermined amount to thereby limit the rate of flow of said fluid through said device irrespective of an increase in the pressure of the fluid in said cylindrical portion above said predetermined amount.

4. The combination as set forth in claim 3 further comprising means adjacent said cavitation chamber to insure dissipation of the cavities formed in said fluid before said cavitating fluid exits said outlet opening.

5. The combination of a pipe coupling having a sleeve with a threaded end and a device insertable into said threaded end for permitting the connection of piping to said sleeve by a correspondingly threaded nut and which is capable of limiting the flow of a liquid through said device to a predetermined rate, said piping having either a convex-shaped or a straight tubular end, said device comprising:
- a. a housing having a frusto-conical outer surface section which has its largest diameter adjacent one end of said housing and its smallest diameter extending in the form of a cylindrical-shaped section to the other end of said housing,
- b. a through-bore in said housing, a first portion of said through-bore being in the shape of a substantially concave socket extending inwardly from said one end of said housing for receiving said convex-shaped end of said connecting piping, a cylindrical portion extending a distance from said concave socket for receiving said straight tubular end of said connecting piping, and
- c. a convergent chamber, a cavitation chamber and a diffusing chamber, said convergent chamber tapering from said cylindrical portion to one end of said cavitation chamber and said diffusing chamber tapering away from said cavitation chamber to an outlet at the other end of said housing, said cavitation chamber being cylindrical in shape and having a length approximately equal to the diameter thereof such that cavitation of said liquid occurs throughout said cavitation chamber when the pressure of said liquid entering said inlet opening reaches a predetermined amount to thereby limit the rate of flow of said fluid through said outlet opening irrespective of an increase in the pressure of said fluid in said cylindrical portion above said predetermined amount, the amount of taper of said diffusing chamber away from said cavitation chamber is at most ten degrees with respect to the axis of rotation of said diffusing chamber to thereby insure dissipation of the cavities formed in said fluid before said cavitating fluid exist said outlet opening.

* * * * *